Oct. 30, 1956 D. N. OBENSHAIN 2,769,140
MEANS FOR MEASURING ELECTRICAL CONDUCTIVITY OF LIQUIDS
Filed March 26, 1952 4 Sheets-Sheet 1

INVENTOR.
DAVID NOEL OBENSHAIN
ATTORNEYS

Oct. 30, 1956     D. N. OBENSHAIN     2,769,140
MEANS FOR MEASURING ELECTRICAL CONDUCTIVITY OF LIQUIDS
Filed March 26, 1952     4 Sheets-Sheet 3

Fig. 5.

INVENTOR.
DAVID NOEL OBENSHAIN

United States Patent Office 2,769,140
Patented Oct. 30, 1956

2,769,140

MEANS FOR MEASURING ELECTRICAL CONDUCTIVITY OF LIQUIDS

David Noel Obenshain, Piedmont, W. Va., assignor to West Virginia Pulp and Paper Company, New York, N. Y., a corporation of Delaware Application March 26, 1952, Serial No. 278,661

19 Claims. (Cl. 324—30)

This invention relates to means for measuring the conductivity of liquids and particularly to novel conductivity cells adapted for such service.

It is an important object of the invention to provide a flow type conductivity cell which will perform its assigned duty consistently and dependably over long periods of time under the conditions of service to which it is exposed; which will not be affected by the size, shape or construction material of the vessel in which it is mounted; which will be resistant to chemical attack and erosion; and which will not collect or retain bubbles or suspended material.

It is also an object to provide a novel cell adjustable for standardizing, adapted for mounting in any position, capable of ready replacement as a complete standardized unit, and adapted for easy servicing in the field without special tools.

The invention has been devised primarily for the determination of the concentration of solutions used in chemical processes and subject to depletion, for example, the cooking of wood chips in paper making. In certain cooking processes it is important that the cooking liquor be maintained at a substantially uniform concentration in order that a uniform pulp may be produced.

In accordance with the present invention, advantage is taken of the fact that the electrical conductivity of a solution is a function of its concentration. If other variables can be eliminated or compensated, the concentration of a solution may be determined by measuring its conductivity.

As broadly stated above, the proposal to utilize conductivity measurement for the maintenance of a desired concentration of solution is not new. In the only prior attempt along this line with which I am familiar, however, conductivity cells were utilized which were crude and unsatisfactory and a method of temperature compensation was employed which was inadequate. The chief problems to which the present invention is addressed are to provide an accurate and consistent measuring unit, and to make the indications given by it exclusively a function of conductivity.

Change of temperature has a greater effect upon the conductivity of a solution than does change of concentration. The conductivity of a solution is a measure of its ability to conduct electrons, and in the case of sulfate cooking liquor is dependent upon the number and mobility of the Na+, OH−, and SH− ions in the liquor. Little ions such as OH− move fast. Big ions such as Na+ and SH− do not move as fast as the OH− ions. In addition, these big ions carry shells of water molecules which increase their size and lower their mobility. This phenomenon is known as solvation. The degree of solvation is a function of the temperature and decreases as temperature increases, with a consequent increase in the mobility of the ions. The viscosity of water also decreases as the temperature increases. As a result, there is approximately a two percent increase in conductivity for each degree centigrade increase in temperature.

It is a primary object of the present invention to provide practical temperature compensation means so that conductivity measurements may be obtained which are a true index of concentration. Two practical and advantageous forms of temperature compensation have been contrived.

In accordance with one of these forms, the previously known expedient is resorted to of balancing a reference cell containing a solution of known conductivity against a measuring cell containing the solution to be tested. This procedure involves difficulties, the most important of which is the fact that bubbles tend to form at the electrodes of the reference cell due to temperature and/or electrolytic action. These bubbles so affect the electrical characteristics of the reference cell as to render the readings undependable as an index of concentration of the cooking liquor, particularly above 100° C.

It is an important feature of novelty that the erratic behavior of the reference cell has been eliminated by maintaining the reference cell full of liquid and the liquid under a false pressure sufficient to prevent the formation of bubbles altogether, even when the temperature is above the normal boiling point of the reference solution.

In accordance with the second form of temperature compensation device, it is a feature that a thermocouple exposed to the temperature of the test liquor is caused to generate a voltage which is a function of temperature, this voltage, linearly amplified, being utilized to drive mechanism for changing the resistance of a variable resistor. The drive mechanism and the resistor are devised to cause the conductivity of the resistor to be varied with temperature in harmony with the known law of variation with temperature of the conductivity of the test liquor when maintained uniformly at the standard concentration. By balancing the resistor, thus affected by temperature, against a reference cell containing test liquor and similarly varied by temperature in a Wheatstone bridge apparatus, an unbalance is obtained which may be utilized for (1) giving a visual indication of the percentage concentration of the liquor as compared to standard concentration, or (2) operating a recorder which graphically shows a continuous record of the percentage concentration of the test liquor as compared to standard concentration, or (3) operating corrective mechanism for supplying concentrated make-up liquor as required, or for performing any two or more of the enumerated functions.

Other objects and advantages will hereinafter appear.

In the drawing forming part of this specification.

Since the novel conductivity cell is used in both forms of illustrative apparatus and itself embodies important features of the invention, it will be described first.

Conductivity measurement consists essentially of placing two electrodes in a solution and measuring the electrical resistance or conductivity of the solution in ohms or mhos, the latter being the reciprocal of the former.

For practical purposes a cell constant value of 1.000 has been assigned to a cell consisting of two electrodes, each with an effective area of one square centimeter and separated an effective distance of one centimeter. The cell constant is a resistance factor and hence an increase of the distance between electrodes or a reduction of the electrode areas increases the value of the cell constant. The conductance measured by a cell having cell constant 1.000 is known as "specific conductance" or the resistance as "specific resistance." Since the effective dimensions of such a cell are quite difficult to measure, the specific conductance of a number of solutions have been carefully determined at various temperatures and are used in determining the cell constant of a conductivity cell.

One difficulty which has been encountered in the use of conductivity cells is polarization. This results from the formation on an electrode of gas bubbles produced by the electrolysis of water. When bubbles form on an electrode the conductivity is greatly changed. To overcome this effect, alternating current is commonly used.

Even when alternating current is used, the electrodes must be completely reversible. Bare metallic or graphite electrodes are not. Platinum black deposited on the electrodes by electroplating seems to be one of the best materials for overcoming polarization. Just how the platinum black achieves this result is not definitely understood. It is generally thought that it catalyzes the reaction of the alternately formed hydrogen and oxygen bubbles produced by the alternating current, so that they re-combine to form water.

In the electrical measuring circuit, it is necessary that the current and voltage waves be maintained in phase. While fixed inductance elements in a bridge circuit can be compensated by fixed capacitors to bring this about, it is important that the conductivity cell produce pure resistance only, because the cell does not produce constant effects. Unplatinized electrodes have a very high capacitance effect and can so unbalance the phase relation of the voltage and current that it becomes impossible to balance the bridge circuit.

Unfortunately the usual platinum black coating is quite fragile and can be easily rubbed off an electrode by contact with the hand or any object, or by a flowing jet or stream of liquid or gas. Many attempts have been made by me to avoid this erosion of the platinum black. In the end a practical solution to this problem was found and it constitutes an important feature of the present invention.

Figures 1, 2, 3, 6, 7:
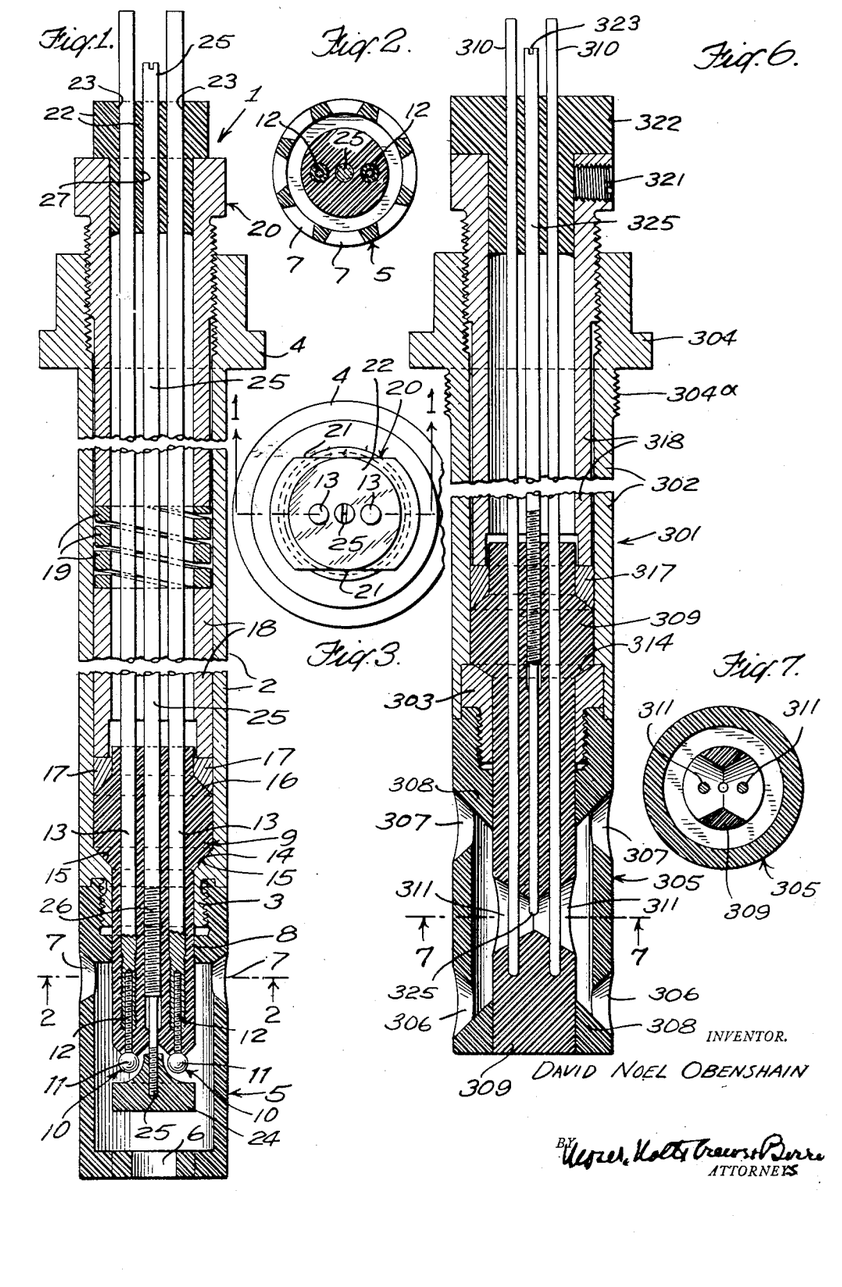
Fig. 1 is a view in sectional elevation of an illustrative conductivity cell which embodies features of the invention, the section being taken on the line 1—1 of Fig. 3, looking in the direction of the arrows.
Fig. 2 is a sectional view taken on the line 2—2 of Fig. 1, looking in the direction of the arrows.
Fig. 3 is a plan view of the cell of Fig. 1.
Fig. 6 is a vertical sectional view of another conductivity cell embodying features of the invention.
Fig. 7 is a transverse sectional view taken upon the line 7—7 of Fig. 6 in the direction of the arrows.

Other problems which were encountered and overcome will be pointed out as a part of, or following, a description of the illustrative conductivity cell of Fig. 1. The cell can be disposed in any attitude when in use. For convenience, however, it will be described with reference to the erect attitude in which it is illustrated.

The cell 1 of Fig. 1 comprises an outer sleeve 2 of stainless steel, having a reduced externally threaded lower end 3 and an external flange 4. The sleeve 2 constitutes the carrier for all the other parts of the cell. It is attached to a wall of a casing or vessel through which hot liquor is circulated by clamping the flange 4 to such wall in a leak-proof manner.

A cap 5 of Teflon (a Du Pont tetrafluroroethylene resin plastic) is threaded onto the reduced end 3 of the sleeve 2. The cap 5 is formed with an end opening 6 at the lower end and with side openings 7 near its upper end through which the test liquor may enter and leave the cap. It is necessary that test liquor flow through the cell in order to make sure that the liquor in the cell corresponds in concentration at all times with the liquor currently being used in the digester or other associated chemical vessel. The cap does, however, moderate the intensity of flow and serve as a protective shield for the coated electrodes which are contained within it.

The cap 5 is formed with an internal flange 8 which slidingly fits and guides the lower cylindrical end of a Teflon block 9. The block 9 serves as a carrier for two platinized electrodes 10 which are desirably composed of stainless steel. Each of the electrodes has an exposed, enlarged parti-spherical tip 11 and a threaded stem 12. Each electrode stem 12 is threaded into the lower end of the Teflon block 9 and into the lower end of an associated conductive rod 13 which is desirably formed of stainless steel. The rods 13 extend upward through and beyond the upper end of the sleeve 2 where they are exposed for connection to circuit conductors (not shown in Figure 1).

Just a short distance above its lower extremity the sleeve 2 is provided internally with an upwardly facing, outwardly inclined, conical shoulder 14 against which a complementary shoulder 15 of the block 9 fits. Above the shoulder 14 the internal diameter of the sleeve 2 is enlarged and the diameter of the block 9 is correspondingly enlarged to fit the internal diameter of the sleeve. Near its upper end the block 9 again has its diameter reduced through an upwardly facing inwardly inclined conical shoulder 16. A wedge bushing 17 fits against the last mentioned shoulder and presses downward against the block 9.

A sleeve 18 slidingly fits the interior of the sleeve 2 and bears downward against the bushing 17, being urged downward yieldingly but forcibly by a compression coil spring 19. The Teflon itself is compressible, the block 9 being adapted to be compressed and/or maintained by the pressure of the spring 19 in conformity with the sleeve 2 and with the rods which pass through the block. A compression sleeve 20 exerts downward pressure against the spring 19. The sleeve 20 is threaded externally near its upper end and is screwed down into the sleeve 2. The head of the sleeve 20 extends above the sleeve 2 and is provided with flattened sides 21 to facilitate turning by a wrench. The upper end of the sleeve 20 is closed by a headed Teflon plug 22 which is held frictionally in place. The plug is formed with bores 23 through which the electrodes 13 extend.

The cell 1 also includes a barrier block 24 of Teflon which is partially interposed between the electrode tips 11, and which may be adjusted up and down to change the length and cross-sectional area of the conductive path between the electrodes, thereby to change the cell constant. Continuous adjustment of the cell constant from 1.100 to 1.750 is possible in a one inch diameter cell of the proportions shown. The block 24 is carefully and accurately made so that the cross-sectional shape and size of its upper end is the same in every axial plane. Thus the conductive path between electrodes is not affected by the rotation of the block 24 about its axis, but only by the adjustment of the block in the direction of its axis. The block is desirably of substantially the cross-sectional shape illustrated in Fig. 1. It presents upwardly facing concave surfaces toward the electrodes.

The block 24 has threaded into it the lower end of a rod 25 by which it is carried and through which it may be adjusted. The rod 25 is desirably made of stainless steel. The rod 25 passes through the block 9. It is formed with an external thread 26 near its lower end through which it has screwed connection with the lower end of the block 9. The rod 25 extends upward through a bore 27 which is formed centrally in the plug 22, and terminates a short distance above the plug 22. The upper end of the rod 25 is formed with a cross-slot for screw driver adjustment. Rotation of the rod causes the rod and the barrier block 24 which is carried by it to be adjusted up or down relative to the other parts of the cell, thereby to increase or diminish the cell constant.

It has been found that Teflon is an excellent insulator for use in cells of this kind. It can withstand chemicals and high temperatures, has zero water absorption, excellent electrical insulation properties, and good machining characteristics. It has some rather surprising undesirable properties, however. Important features of the invention have to do with the avoidance of objectionable characteristics caused by these properties.

A serious fault found in earlier designs in which stainless steel electrodes were anchored in Teflon insulators at points remote from the tips of the rods arose from the differential thermal expansion of the stainless steel and the Teflon. Teflon has a linear coefficient of thermal expansion five and one-half times as great as that of stainless steel. This caused extensive creeping of the electrodes relative to the insulators and considerable liquid leakage. It also caused the platinum black to be rubbed off the electrode tips in the regions (about 1/32" long) which were alternately covered and uncovered by the expanding and contracting insulators.

In the illustrative cell of Fig. 1 these faults are avoided chiefly because of two features. The utilization of the spring 19 to keep the Teflon block 9 pressed firmly down against the seat 14 at all times prevents leakage of liquid around the block 9. The fact that the electrodes 10 near their tips 11 are positively connected to the Teflon block 9 near the lower extremity of the Teflon block reduces to a negligible amount the relative creep between the electrodes and the insulator block due to differential thermal expansion. The fact that the carrier rod 25 for the barrier block 24 has threaded engagement with the block 9 near the lower ends of the rod and the block 9 assures that the conductive path between the electrode tips will not be substantially varied because of any relative vertical movement of the electrode tips 11 on the one hand and the barrier block 24 on the other as the temperature changes. Because the electrodes are similarly mounted side by side in the lower end of the Teflon block 9 they simply move up and down in unison with one another without affecting the cell constant.

Another very serious difficulty encountered in the use of Teflon had to do with the fact that the Teflon tends to grow in service. The lengthwise growth amounts to approximately 1/8" per inch of length when the Teflon is used at digester temperatures for several months. This characteristic is thought to be due to endwise compression of the Teflon in forming the bar stock. The adverse effects of any growth tendency are, however, substantially eliminated by the features of construction already described, namely, the utilization of the spring 19 and the positive connection of the electrodes and the rod 25 to the Teflon block 9 near the electrode tips 11.

The spherical shape of the electrode tips is desirable because it gives a maximum radius for the surface area. It has been observed that the platinum black has a tendency to crack or peel off in the small radius ends and corners of previous designs. The size of the electrode tips is limited, however, in order to assure a cell constant value of more than 1.000. This is desirable in cells intended for the service described because of the high conductivity of the solutions employed.

A further important innovation is embodied in the platinized electrode of Fig. 1. The standard platinizing procedure of the prior art consists of immersing the electrodes of the assembled conductivity cell in a solution containing 100 grams of distilled water, 3 grams of platinum chloride, and .02 gram lead acetate. The conductivity cell is connected to a direct current three volt source of electrical potential through a reversing switch. The direction of current flow is reversed every thirty seconds, the total time required being from six to eight minutes. The coating thus applied is extremely fragile. It flakes off and rubs off at the slightest disturbance. It is very easily eroded by liquid flow.

I have found that if the standard procedure is followed in every way save that the lead acetate content of the solution is cut down to .01 gram (this being 0.1% concentration as compared to 3% concentration for the platinum chloride and just one-half of the previous standard lead acetate content) a greatly improved result is obtained. More lead acetate causes the coating to become more spongy and fragile. Less lead acetate causes the coating to become more metallic until with no lead acetate content in the solution, the coating becomes a fully metallic platinum plating which tends to peel off. Useful results definitely superior to those obtained by following the prior art are found to result when the lead acetate concentration is between .0075% and .0135%. Platinizing according to my method produces deposits of very good mechanical strength. In fact, some of the deposits resist wiping off even with a rough towel, and require sanding for complete removal. They have, moreover, the desired depolarizing characteristics. The electrodes embodied in the conductivity cell of Fig. 1 are produced by my improved method and have the improved properties characteristic of electrodes produced by that method.

Figure 4:
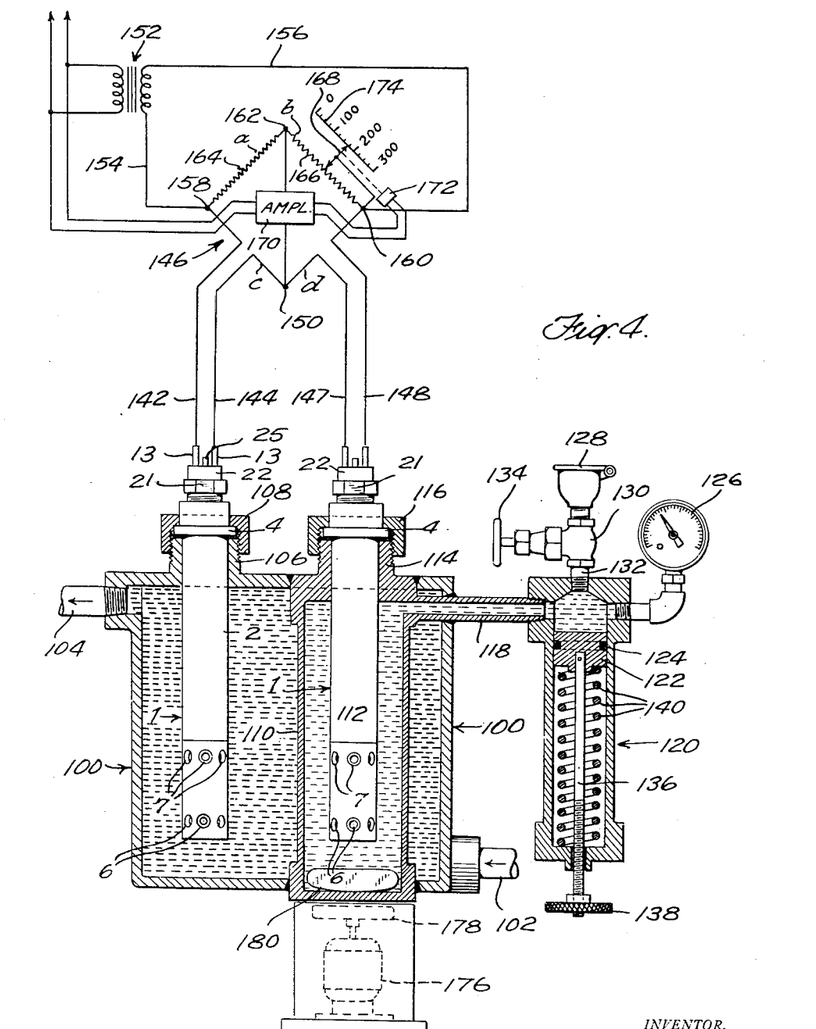
Fig. 4 is a sectional elevation, largely diagrammatic of a temperature compensated concentration measuring apparatus in which measuring and reference cells are utilized.

In Fig. 4 disclosure is made of apparatus in which automatic temperature compensation for conductivity measurements is provided through the employment of a reference cell, the conductivity (or resistance) of the two cells being compared through a Wheatstone bridge apparatus.

A casing 100 is provided which is equipped with a lower inlet connection 102 and an upper outlet connection 104. Liquor is continuously supplied to the casing 100 from the digester through the inlet connection 102 and returned to the digester through the outlet connection 104. A conductivity or measuring cell 1 which is desirably in all respects like the conductivity cell of Figs. 1–3 is mounted in the casing with its flange 4 clamped in a leak-proof manner between a threaded boss 106 of the casing and a union coupling 108.

A smaller casing 110 extends vertically through the casing 100, being rigidly secured and sealed to the top and bottom of the casing 100 in any suitable manner, as by welding. The casing 110 does not communicate with the interior of the casing 100, and hence the test or operating liquor does not have access to the interior of the casing 110. A reference cell 112 is mounted in the casing 110, the reference cell being desirably a duplicate of the conductivity or measuring cell 1. The reference cell 112 is secured in the casing 110 in the same manner that the cell 1 is secured in the casing 100, through a threaded boss 114 on the casing and a union coupling 116.

It is the intention that the liquid in the casing shall correspond in conductivity to the test liquor at standard concentration of the latter and that its conductivity shall have the same law of variation with temperature. The employment of black liquor for use in the reference cell would be ideal but for the fact that the black liquor is not stable as a reference solution. A number of solutions have been tried without finding one which is completely satisfactory. A sodium hydroxide solution has been found the best of those tried and is capable of yielding practically useful results.

I have found that the formation and collection of bubbles on the electrodes of the reference cell can be avoided if, and only if, the casing 110 is kept completely full of liquid at all times with this liquid maintained under a false pressure of 15 to 20 p. s. i. above the vapor pressure of the reference solution at the existing temperature.

Provision is accordingly made of mechanism for replenishing the liquid in the reference cell, for applying pressure to it, and for indicating the pressure under which it is maintained. The pressure is desirably set and maintained at 15 to 20 p. s. i. above the vapor pressure of the reference solution at the highest temperature to which it is expected to be subjected in the apparatus.

A tube 118 in communication with the upper end of the casing 110 extends outward through a wall of the casing 100 into communication with a chamber formed by the upper end of a cylinder 120. The cylinder 120 contains a piston or plunger head 122. The piston 122 is desirably provided with one or more sealing rings 124 of a suitable material such as "neoprene." The upper end of the cylinder 120 is in communication with a pressure gauge 126. A filling cup 128 is connected through a valve 130 and a nipple 132 with the interior of the upper end of the cylinder 120. The valve may be manually operated between open and closed positions through a finger wheel 134.

The piston 122 has affixed to it a piston rod 136. The piston rod had its lower end threaded, and passes through the lower end of the cylinder 120. A handwheel 138 is threaded onto the protruding end of the piston rod for retracting the piston when filling with liquid. A compression coil spring 140 surrounds the rod 136. The spring bears at its lower end against the lower end of the cylinder 120 and at its upper end against the lower side of the piston 122, serving at all times to urge the piston in an upward direction.

When it is desired to replenish the liquid in the cylinder and casing, the piston is retracted until the gauge shows that the pressure in the casing is not above atmospheric pressure. Liquid is poured into the filler cup, and the valve 130 is opened. Any flow of liquid from the cup into the cylinder will be indicated by bubbling up of gas through the solution in the filler cup, and/or a fall of level of the liquid in the filler cup. When it is evident that bubbling, if any has occurred, is at an end the valve 130 is closed and the hand wheel 138 is turned to again place the reference solution under spring pressure.

The spring 140 is so designed that increased expansion of liquid inside casing 110 due to temperature compresses the spring and automatically maintains the pressure of the liquid at a value above the boiling point of the liquid at any temperature within range of the apparatus.

The measuring cell 1 is connected through conductors 142 and 144 in arm c of a Wheatstone bridge apparatus 146. The reference cell 112 which is a duplicate of the measuring cell 1 is connected through conductors 147 and 148 in arm d of the Wheatstone bridge apparatus. Arms c and d are joined to one another at point 150.

Alternating current at low voltage is inductively supplied through a transformer 152 to conductors 154 and 156 of the bridge circuit. The conductors 154 and 156 are connected to one another through arms c and d, the conductor 154 being connected to arm c at the point 158, and the conductor 156 being connected to the arm d at point 160. The points 158 and 160 are also connected to one another through arms a and b of the bridge. The arms a and b are joined to one another at point 162.

The arm a includes a fixed resistor 164 while the arm b includes a resistor 166 whose effective value may be varied through a sliding contact 168. A bridging connection is made between points 150 and 162 through an amplifier 170. A reversible motor 172 controlled by the output of the amplifier is connected to slider 168 so as to position the slider as may be required.

When the bridge is out of balance, the sliding contact 168 will be moved in the appropriate direction to restore balance. It is well understood, of course, that the bridge will be in balance when $$\frac{Ra}{Rb} = \frac{Rc}{Rd}$$

where $Ra$, $Rb$, $Rc$ and $Rd$ represent, respectively, the resistances of arms $a$, $b$, $c$, and $d$ of the bridge. A scale 174 is desirably provided for cooperation with the movable contact 168, or a pointer carried by it. This scale indicates in percentage the concentration of the digester liquor as compared with standard concentration. The indication is obtained when the sliding contact has been adjusted as required to bring the bridge into balance. When the concentration is indicated as substantially below one hundred percent, concentrated make-up solution may be fed into the digester in a quantity estimated to be the amount required for restoring the test solution to standard strength.

A magnetic stirrer is provided to keep the reference solution mixed up and to aid rapid heat transfer. I have found also that the conductivity decreases slightly with stirring. Thus the stirred-up reference solution is caused more nearly to match in condition the condition of the solution being tested.

The stirrer comprises a motor 176 which rotates a magnet 178 directly beneath and in proximity to the bottom of the casing 110. A magnet 180 rotatively mounted within the bottom of the casing 110 is caused to be driven by the magnet 178. The magnet 180 constitutes the means for agitating the reference solution. The bottom of casing 110 is substantially non-magnetic.

If fluctuations of temperature are slight and occur infrequently, the reference solution will be maintained at all times at substantially the temperature of the solution which circulates through the casing 100. If, however, the temperature fluctuations are frequent or marked, the apparatus of Fig. 4 will not work out in a very satisfactory manner because of the temperature lag of the reference solution. For meeting conditions of that kind, resort must be had to a further embodiment of the invention illustrated in Fig. 5.

Figure 5:
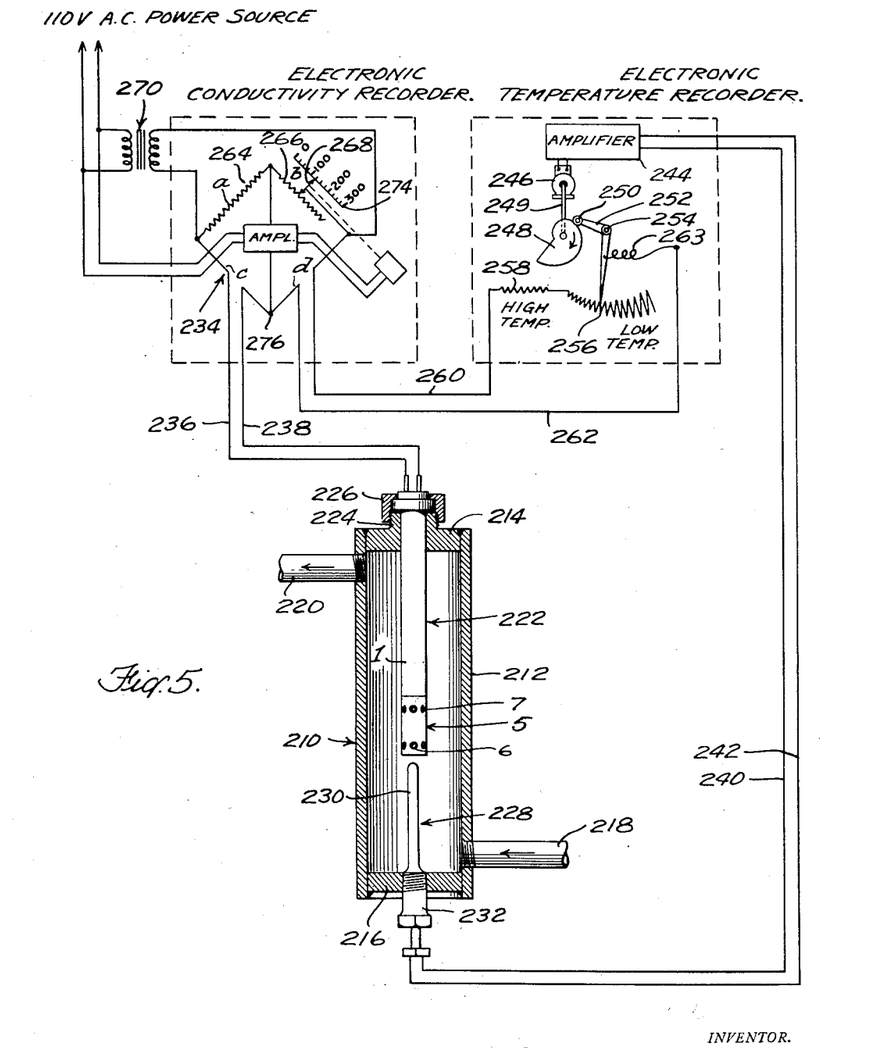
Fig. 5 is a view similar to Fig. 4 of another form of temperature compensated concentration measuring apparatus, employing a temperature actuated variable resistor as the compensating means.

In the form of mechanism illustrated in Fig. 5, a casing 210 is provided consisting of a tubular body part 212 and upper and lower end closure plugs 214 and 216, through which hot liquor is diverted from the digester or other associated chamber in which the liquor is employed. The liquor is introduced into the casing near the bottom of the casing through a conduit 218 and flows out from the top through a conduit 220, being returned to the digester by the latter conduit.

A conductivity cell 222 like the cell of Figs. 1 to 3, is introduced into the casing 210 from above, being secured to the casing through a threaded boss 224 on the plug 214 and a union coupling 226. A low mass thermocouple 228 is introduced into the opposite end of the casing 210 through the plug 216. The thermocouple is desirably of a well known type employing iron and constantan in contact with one another and having the hot joint enclosed within a metallic bulb 230. The bulb 230 is made unitary with a larger diameter externally threaded fitting 232 which is screwed tightly into the plug 216 to provide a sealed joint. It will be observed that the hot junction of the thermocouple and the conductivity cell are maintained at the same temperature, both being exposed to the temperature of the liquor which flows continuously from the digester through the small casing 210 and back to the digester again. There is no substantial temperature lag.

The conductivity cell is included in the arm c of a Wheatstone bridge apparatus 234 through conductors 236 and 238. The resistance of the arm c is, therefore, subject to change with change of temperature and with change of liquor concentration. The thermocouple 228 is conected to a standard commercial temperature recorder 244 having a balancing motor 246. To this motor is added cam 248 on shaft 249, which shaft also carries the recorder temperature indicator not shown. The cam 248 acts upon a follower 250 which is carried at the end of one arm of a bellcrank 252. The bellcrank 252 is pivoted at 254. Its second arm, which is conductive, serves as a sliding conductive contact in engagement with a taper wound resistor 256. The cam 248 is desirably designed to cause the bellcrank 252 to move approximately equal angular distances for equal increments of temperature. The resistor 256 is then taper wound in a manner to cause its resistance to change with temperature in accordance with the law which governs the resistance of the conductivity cell when using the test solution at standard concentration, i. e., at low temperatures the resistors have to have relatively great resistance changes per unit change in temperature, while at high temperatures this change per unit change in temperature is quite small. The resistor 256 is connected in series with a fixed resistor 258, and these resistors are included in the arm $d$ of the Wheatstone bridge apparatus 234 through conductors 260, 262 and 263. The cam 248 may be exactly tailored to match irregularities in the resistor 256 as well as the specific characteristics of the liquid being measured.

The cam 248 and the resistor 256 may be varied in other ways, as desired, so long as the desired law of variation of resistance of the arm $d$ with temperature of the test solution is obtained.

The cam 248 is readily removable and replaceable in the apparatus, being secured upon the shaft 249 by a hand nut (not shown) so that cams of different contours can be provided for different solutions that may be employed.

The cell 301 of Figs. 6 and 7 resembles the cell 1 of Figs. 1–3 in many respects. It comprises an outer sleeve 302 of stainless steel which carries at its inner end a reduced threaded bushing 303. The casing sleeve 302 carries all the other parts of the cell. It includes an external flange 304 and attaching threads 304a immediately below the flange. A shield 305 of Teflon is threaded onto the bushing 303. The shield is formed all around with lower side openings 306 and with upper side openings 307 through which the test solution may enter and leave the shield. The flow path is such that no liquid may directly impinge upon the electrodes.

Openings 306 are provided at the very bottom of the shield chamber and are formed with sloping bottom faces so that no sediment may collect within the shield. The shield 305 is formed with upper and lower internal flanges 308 which fit the lower end of the Teflon block 309. The block 309 serves as a carrier for two platinized electrodes 310 which are desirably composed of stainless steel. Each of the electrodes 310 extends down across a transverse opening 311 which is formed in the block 309 and has its lower extremity extended into the block below the opening 311. The electrodes in this instance are not threaded to the block 309 but simply have a tight fit in the block. The rods 310 extend upward through and beyond the upper end of the sleeve 302 where they are exposed for connection to circuit conductors.

The block 309 is provided with an enlarged portion which fits within the lower end of the sleeve 302 between the bushing 303 and a wedge compression bushing 317. A sleeve 318, threaded near its upper end, is screwed into the upper end of the sleeve 302 and bears downward against the bushing 317 to press the bushing, the enlargement of the block 309 and the bushing 303 forcibly together. The pressure compresses the Teflon of the block 309, causing it to bear outward against the sleeve 302 and inward against the rods 310. The upper end of the sleeve 318 is closed by a headed Teflon plug 322 which is held in place by a set screw 321, the set screw being threaded into the sleeve 318 and into engagement with the plug. The plug 322 is formed with bores through which the electrodes 310 extend.

The cell 301 includes an adjustable calibrating barrier rod 325 of stainless steel or other suitable material which extends through the plug 322 and the upper portion of the block 309, terminating in the opening 311 between the electrodes 310. The rod 325 has a threaded portion screwed into the upper part of the block 309 and a reduced lower end portion whose lower extremity serves as the ion interference or barrier element between the electrodes. The rod is provided at its upper end with a screwdriver slot 323 whereby it may be turned to adjust it axially, for establishing the cell constant at a desired value. The exposed portions of the electrodes are platinized as before, desirably according to the novel method described in connection with the electrodes of Figures 1–3.

The cell of Figs. 6 and 7 is not so well adapted as the cell of Figs. 1–3 to withstand high temperatures or wide variations of temperature. It is, however, well adapted for use in apparatus which is always employed at a substantially unvarying, moderate temperature, and it has been shown capable of use in such service without substantial attention over long periods of time. Where expansion is no problem this simpler design performs exceptionally well.

Figures 8, 9, 10, 11, 12, 13:
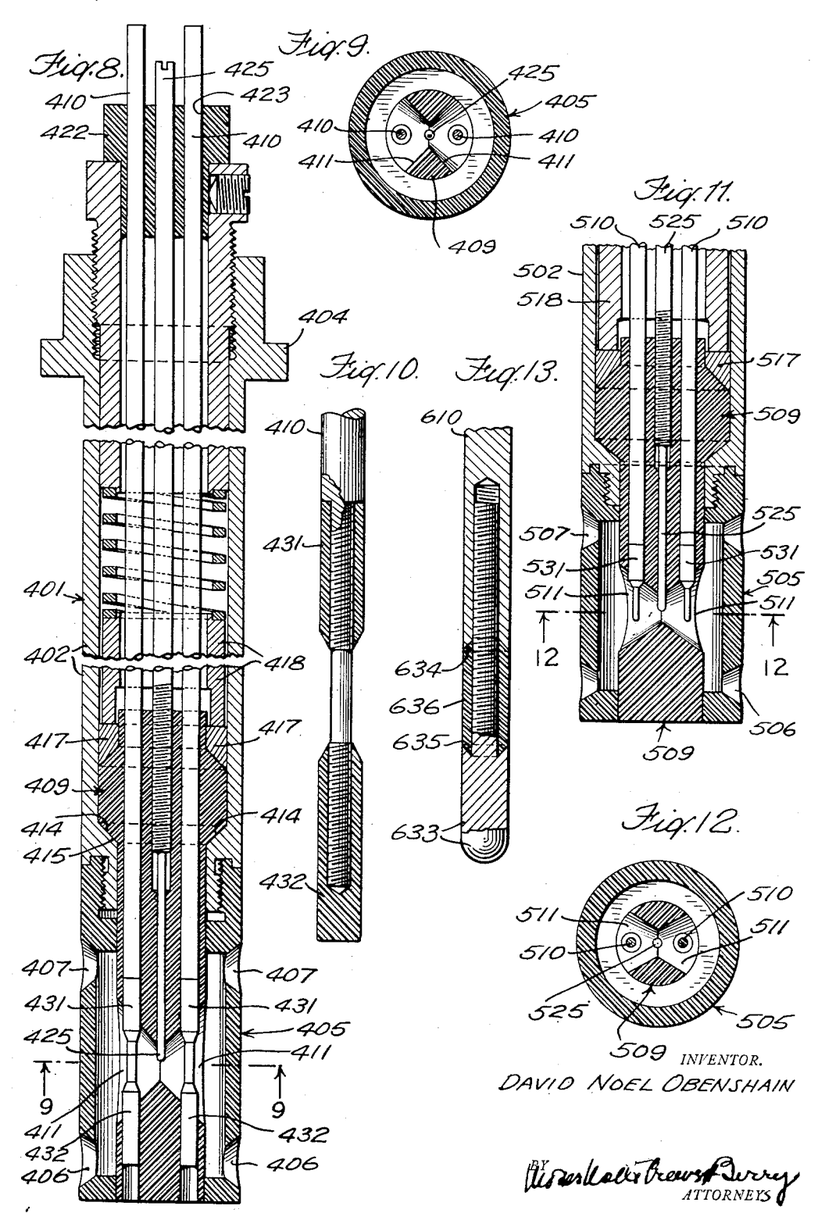
Fig. 8 is a vertical sectional view of still another conductivity cell embodying features of the invention.
Fig. 9 is a transverse sectional view taken upon the line 9—9 of Fig. 8, in the direction of the arrows.
Fig. 10 is a fragmentary detail view of one of the electrodes of Figs. 8 and 9 with associated parts.
Fig. 11 is a fragmentary vertical sectional view of a further form of conductivity cell embodying features of the invention.
Fig. 12 is a transverse sectional view taken upon the line 12—12 of Fig. 11, in the direction of the arrows.
Fig. 13 is a fragmentary detail view of a modified form of electrode adapted for use in a structure like that of Figs. 11 and 12.

The cell of Figures 8 and 9 is in most features like the cell of Figs. 1–3. In the main, therefore, numerals increased by 400 have been applied to corresponding parts and the description will be confined to parts which are specifically different from the disclosure of Figs. 1–3. The block 409 is like the block 309 of Figs. 6 and 7 and the shield 405 is like the shield 305 of Figs. 6 and 7, being formed with lower and upper side openings 406 and 407 and with upper and lower internal flanges which fit the block 409. The barrier rod 425 is like the barrier rod 325 of Figs. 6 and 7.

The electrodes 410 are tightly fitted in the block 409 and in general resemble the electrodes of Figs. 6 and 7. They are, however, reduced at their lower ends and have upper and lower Teflon sleeves 431 and 432 threaded onto them. Each of the upper sleeves 431 fits into the block 409 and bears against a downwardly facing shoulder of the rod 410. The sleeves 431 and 432 protrude into the openings 411 of the block 409 at all times, and since they move with the electrodes relative to the block 409 they serve to maintain substantially unvarying areas of the electrodes exposed between them for contact with the test solution at all temperatures. This constitutes a very efficient means of avoiding the rubbing off of platinum black with alternate expansion and contracting, of avoiding the changes of conductivity which would result if the area of the electrode exposed to the solution were permitted to vary with temperature, and of avoiding progressive change of characteristics as the block 409 grows. The cell of Figs. 8 and 9 is interchangeable with the cell of Figs. 1–3, and has been found practical and efficient under all conditions of service.

The cell of Figs. 11 and 12 is the same as that of Figs. 8–10, save for a feature having to do with the electrodes. The reference numerals applied to corresponding parts have accordingly been increased by 100 over the reference numerals of Figs. 8–10, and no general detailed description will be given. As in the case of Figs. 8–10, the electrodes 510 are reduced in diameter near their lower ends and protective Teflon sleeves 531 are applied to the electrodes to lie partly within and partly below the block 509. The lower ends of the electrodes 510 terminate within the opening 511 and no lower sleeves are provided. This is a simpler way of providing uniform electrode exposure under varying temperatures.

Still another way of assuring uniform electrode exposure is illustrated in Fig. 13. The electrode rod 610 of Fig. 13 is applied to a construction like that of Figs. 11 and 12. The electrode tip 633 is a separate member having a threaded stem which is screwed upward into the rod 610. Between a downwardly facing shoulder 634 on the rod 610 and an upwardly facing shoulder 635 on the electrode tip 633 a sleeve 636 of Teflon is interposed, the sleeve being compressed between the shoulders. The action is generally the same as that of Figs. 11 and 12. In the Fig. 13 construction, however, the sleeve 636 is compelled to retain a definitely fixed length.

While certain preferred embodiments of the invention have been illustrated and described in detail, it is to be understood that changes may be made therein and the invention embodied in other structures. It is not therefore the intention to limit the patent to the specific constructions illustrated, but to cover the invention broadly in whatever form its principles may be utilized.

I claim:

1. A conductivity cell operable through a range of temperatures which extends far above the boiling point of water, and comprising in combination, a metallic carrier sleeve, an insulator block filling the bore of said sleeve for a portion of its sleeve length, a pair of electrodes passing inward through said block and clear thereof and having adjacent the lower end of the sleeve substantially identical platinum-black-coated lengths to be exposed to the solutions to be tested, the insulator block being capable of withstanding temperatures far above the boiling point of water, having a temperature coefficient of expansion much greater than that of the electrodes so that it tends to lose sealing contact with the electrodes, but being compressible and elastic so that sealing contact can be maintained under compression, and means continually compressing said insulator block within its elastic limit but under sufficient pressure to maintain it laterally deformed into sealing contact with the electrodes passing through it and with the bore of the surrounding sleeve throughout the operative temperature range.

2. The conductivity cell according to claim 1 having an externally adjustable ion path interference element passing through said block and extending into the ion path between the electrodes for the purpose of regulating the cell constant.

3. The conductivity cell according to claim 2 in which the ion path interference element is extended into accessible position at the upper end of the sleeve and is in screw threaded relation to the block.

4. The conductivity cell according to claim 1 having a shielding cap secured upon the lower end of the sleeve and surrounding the platinized portions of the electrodes and having flow passages formed in it in such relation to the electrodes that no liquid may impinge directly upon said portions thereof.

5. The conductivity cell according to claim 1 in which the block is composed of polytetrafluorethylene resin plastic.

6. The conductivity cell according to claim 1 in which said platinum-black-coated portions are substantially parti-spherical in form.

7. The conductivity cell according to claim 6 in which an interference element has an effective or barrier portion of its ion path extended beneath the electrodes, said element being of uniform cross section in all axial planes whereby the cell constant will not depend upon the rotative disposition of the barrier.

8. A conductivity cell in accordance with claim 1 in which said insulating block has a transverse opening which is crossed at least in part by both electrodes, the electrodes being exposed to contact with the test liquid in said opening only.

9. A conductivity cell in accordance with claim 8 in which said insulating block has a transverse opening which is crossed completely by both electrodes, and having a barrier or ion path interference member mounted in the insulating block with capacity for longitudinal adjustment, said member having its active end disposed in the transverse opening of the insulating block between the electrodes.

10. The conductivity cell according to claim 1 which includes a pressure member having threaded connection with the sleeve for compressing said block thereinto and around both of said electrodes in a pressure tight fit, and a compression spring mounted between said pressure member and said block for maintaining the compression of the block throughout a wide range of temperatures.

11. A conductivity cell in accordance with claim 1 in which said block has a transverse opening across which the electrode rods extend, the rods having reduced lower end portions which are threaded above and below said openings, and insulating sleeves threaded on each rod for slidable engagement in the insulating block above and below the opening, the arrangement being such that the sleeves protrude partially into said opening and maintain equal and uniform areas of the rods exposed at all times.

12. The conductivity cell in accordance with claim 1 having the pair of electrodes in the form of rods mounted in fitting, parallel relation within the block, the block having a transverse opening into which the platinized tips of the electrode rods extend, the tips of the electrode rods being of reduced cross-section and extending inward from shouldered portions of the rods and having their ends adjacent the shoulders threaded, and insulating sleeves screwed onto said threaded portions and disposed to be slidingly received in the insulating block whereby equal tip areas of the two rods are constantly exposed within the transverse opening for contact with the test liquid.

13. The conductivity cell in accordance with claim 1 in which the block has a transverse opening into which the electrodes in the form of rods extend, each electrode rod including a body portion and a platinized tip portion connected to one another through a threaded shank, the body and tip portions having shoulders which confront one another, and a sleeve of insulating material surrounding the threaded shank and clamped between said shoulders, the sleeve being slidable in the insulating block and being partially contained therein.

14. The conductivity cell according to claim 1 in which the coatings of platinum black have the tenacity and toughness characteristic of such coatings when deposited by electroplating from substantially a three percent platinum chloride solution containing lead acetate in quantity by weight not less than .0025 nor more than .0045 of the platnium chloride content.

15. The conductivity cell according to claim 1 in which the electrodes comprise conductive rods extending into the insulator block to points near the inner end thereof, said rods having their inner ends threaded into the block, the electrodes proper having comparatively small threaded stems and comparatively large tips, each stem being screwed into the lower end of the block and into the lower end of the associated conductive rod to provide a fixed connection between the rod and electrode proper near the electrode tip and to provide a secure seal between the insulator block and the electrode proper on the one hand and between the electrode proper and rod on the other.

16. The conductivity cell in accordance with claim 1 in which the block has a transverse opening into which the electrodes in the form of rods extend, each electrode rod including a body portion and a tip portion connected to one another through a threaded shank, the body and tip portions having shoulders which confront one another, and a sleeve of insulating material surrounding the threaded shank and clamped between said shoulders, the body, tip and sleeve being of equal external diameters and the sleeve being slidable in the insulating block and partially contained therein.

17. A conductivity cell comprising in combination a metallic carrier sleeve, a comparatively short insulator block composed of polytetrafluorethylene resin plastic filling the bore of the sleeve at the lower end thereof, means for mounting the block under longitudinal pressure to cause it to form a sealed joint with the sleeve, a pair of electrode rods extending through the major portion at least of the block and having identical platinum-black-coated portions of predetermined area exposed adjacent the lower end of the block, the block having a temperature coefficient of expansion much greater than that of the electrodes, and means for maintaining the exposed areas substantially invariable notwithstanding differential expansion of the sleeve and block.

18. A conductivity cell comprising in combination a metallic carrier sleeve, a comparatively short insulator block composed of polytetrafluorethylene resin plastic filling the bore of the sleeve at the lower end thereof, means for mounting the block under longitudinal pressure to cause it to form a sealed joint with the sleeve, a pair of electrode rods extending through the major portion at least of the block and having identical platinum black coated portions of predetermined area exposed adjacent the lower end of the block, the block having a temperature coefficient of expansion much greater than that of the electrodes, and means for maintaining the exposed areas substantially invariable and substantially free from rubbing by the block, notwithstanding differential expansion of the sleeve and block.

19. An electrolytic conductivity cell adapted for high-temperature, high-pressure operation, comprising in combination a tubular metallic casing having means for pressure tight attachment through the wall of a pressure vessel, a compressible insulator block mounted in a constricted inner end of the casing, an insulator block compressor sleeve extending to and beyond the outer end of the casing and adjustably mounted in the casing by means of a screw threaded connection, and three metallic rods extending from beyond the outer end of the compressor sleeve inward through the insulator block, each of the rods being out of electrical contact with the other rods and with other solid conductive parts of the cell, two of these rods having platinized electrodes at their inner ends, the third rod located substantially midway between the other two rods and terminating at its inner end in an ion path interference element, this third rod and the insulator block having engaged matching threads so that rotation of the rod moves the ion path interference element to increase or decrease its interference action, said compressor sleeve being so tightened as to compress the insulator block into pressure sealing contact with the casing and with the three rods passing therethrough.

References Cited in the file of this patent
UNITED STATES PATENTS

| Number | Name | Date |
|---|---|---|
| 1,524,937 | Keeler | Feb. 3, 1925 |
| 1,555,803 | Huber | Sept. 29, 1925 |
| 1,592,979 | Keeler | July 20, 1926 |
| 1,601,383 | Todd | Sept. 28, 1926 |
| 1,670,640 | Smith | May 22, 1928 |
| 1,807,821 | Behr | June 2, 1931 |
| 1,826,886 | Keeler | Oct. 13, 1931 |
| 1,912,188 | Gann | May 30, 1933 |
| 1,912,997 | Parker | June 6, 1933 |
| 1,951,035 | Parker | Mar. 13, 1934 |
| 2,067,604 | Godsey | Jan. 12, 1937 |
| 2,170,193 | Godsey | Aug. 22, 1939 |
| 2,176,471 | Pyle et al. | Oct. 17, 1939 |
| 2,397,962 | Hartz | Apr. 9, 1946 |
| 2,470,153 | Feller | May 17, 1949 |
| 2,560,209 | Borell et al. | July 10, 1951 |
| 2,611,007 | Cade et al. | Sept. 16, 1952 |